(12) United States Patent
Haygood et al.

(10) Patent No.: US 6,857,178 B2
(45) Date of Patent: Feb. 22, 2005

(54) METHODS OF MAKING UPHOLSTERY FABRIC TACK STRIPS

(76) Inventors: David L. Haygood, 1260 County Rd. 175, Florence, AL (US) 35634; Gary T. Schwertner, 300 Rock Crusher Rd., St. Joseph, TN (US) 38481

( * ) Notice: Subject to any disclaimer, the term of this patent is extended or adjusted under 35 U.S.C. 154(b) by 40 days.

(21) Appl. No.: 10/180,583

(22) Filed: Jun. 27, 2002

(65) Prior Publication Data

US 2002/0185773 A1 Dec. 12, 2002

Related U.S. Application Data

(62) Division of application No. 09/876,229, filed on Jun. 8, 2001, now Pat. No. 6,537,646.

(51) Int. Cl.[7] ................................................ B21B 1/46
(52) U.S. Cl. ..................... 29/527.2; 29/469.5; 264/139; 411/466; 428/132
(58) Field of Search .............................. 29/527.2, 91.1, 29/469.5, 91; 264/139, 171.14, 171.21, 279, 279.1; 428/132, 133; 470/158; 411/466

(56) References Cited

U.S. PATENT DOCUMENTS

| | | | | |
|---|---|---|---|---|
| 1,968,365 A | * | 7/1934 | Bailey | 428/133 |
| 2,006,381 A | * | 7/1935 | Bailey | 428/133 |
| 3,833,987 A | * | 9/1974 | Owen | 29/890.048 |
| 4,094,056 A | * | 6/1978 | Takeda et al. | 29/527.2 |
| 4,547,954 A | * | 10/1985 | vanManen | 29/458 |
| 4,578,858 A | * | 4/1986 | Adell | 29/527.4 |
| 4,581,807 A | * | 4/1986 | Adell | 29/527.4 |
| 4,697,327 A | * | 10/1987 | Adell | 29/527.4 |
| 5,098,243 A | * | 3/1992 | Buck | 411/466 |
| 5,468,438 A | * | 11/1995 | Yada | 264/139 |
| 5,613,817 A | | 3/1997 | Bush et al. | 411/466 |
| 5,956,804 A | | 9/1999 | Dunne | 16/16 |
| 6,435,792 B1 | * | 8/2002 | Farris et al. | 411/466 |
| 6,537,646 B2 | * | 3/2003 | Haygood et al. | 428/132 |
| 6,647,610 B1 | * | 11/2003 | Haygood et al. | 29/527.2 |
| 6,680,017 B1 | * | 1/2004 | Koch et al. | 264/171.16 |
| 2004/0001936 A1 | * | 1/2004 | Haygood et al. | 428/99 |

* cited by examiner

Primary Examiner—Essama Omgba
(74) Attorney, Agent, or Firm—Nixon & Vanderhye P.C.

(57) ABSTRACT

An upholstery tack strip includes a thermoplastic sleeve and a metal ribbon embedded within the sleeve. The sleeve itself includes a plurality of removed material sections forming opposed pairs of sleeve windows, while the metal ribbon integrally includes nail sections which protrude outwardly from the tack strip through respective ones of the sleeve windows. Most preferably, the sleeve is extrusion-coated onto the metal ribbon stock using a cross-head die. The thus-coated metal strip preform may then be transferred to downstream fabrication operations whereby the sleeve windows and nail portions are formed. Since the nail portions protrude outwardly from the tack strip through the sleeve windows, relative lengthwise slippage between the metal ribbon stock and the sleeve is prevented.

11 Claims, 5 Drawing Sheets

METHODS OF MAKING UPHOLSTERY FABRIC TACK STRIPS

This application is a division of Application Ser. No. 09/876,229, filed Jun. 8, 2000 (now U.S. Pat. No. 6,537,646), the entire content of which is hereby incorporated by reference in this application.

FIELD OF THE INVENTION

The present invention relates generally to the field of upholstery fabric tack strips and methods of making the same, especially tack strips that are used to attach upholstery fabric to an underlying furniture frame member.

BACKGROUND AND SUMMARY OF THE INVENTION

Conventional upholstery tack strips are made from flat metal (e.g., metal) ribbons by a punch-press operation. Specifically, generally triangularly-shaped nails are formed by punching out correspondingly shaped, partially cut-out sections from the metal ribbon at spaced-apart locations along the ribbon's length and then bending the sections so each is at substantially a right angle relative to the ribbon stock. Thus, the nails remain unitarily attached to the metal ribbon, but project outwardly therefrom.

In use, the metal from which conventional tack strips are made can physically mar and/or abrade the upholstery fabric. For example, the ribbon, if formed from metal, may rust over time which might in turn visibly discolor the fabric. Furthermore, the edges of the metal tack strip may abrade or cut the upholstery fabric. In order to prevent such problems, it has been conventional practice to provide upholstery tack strips with a separate C-shaped plastic sleeve which slides over the tack strip along its length. The plastic sleeve, however, is itself problematic in that it involves a separate manufacturing step to slideably mate it with the tack strip. Furthermore, unless some means are provided to restrict relative lengthwise movement between the metal tack strip and the sleeve, the latter can become separated from the former during use and/or installation.

What has been needed therefore are upholstery tack strips that minimize, if not eliminated entirely, the problems noted above. It is towards providing solutions to such problems that the present invention is directed.

According to the present invention, upholstery tack strips are provided which include a thermoplastic sleeve and a metal ribbon embedded within the sleeve. The sleeve itself includes a plurality of removed material sections forming opposed pairs of sleeve windows, while the metal ribbon integrally includes nail sections which protrude outwardly from the tack strip through respective ones of the sleeve windows. Most preferably, the sleeve is extrusion-coated onto the metal ribbon stock using a cross-head die with a screw extruder. The thus-coated metal strip preform may then be transferred to downstream fabrication operations whereby the sleeve windows and nail portions are formed. Since the nail portions protrude outwardly from the tack strip through the sleeve windows, relative lengthwise slippage between the metal ribbon stock and the sleeve is prevented.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

Figure 1:
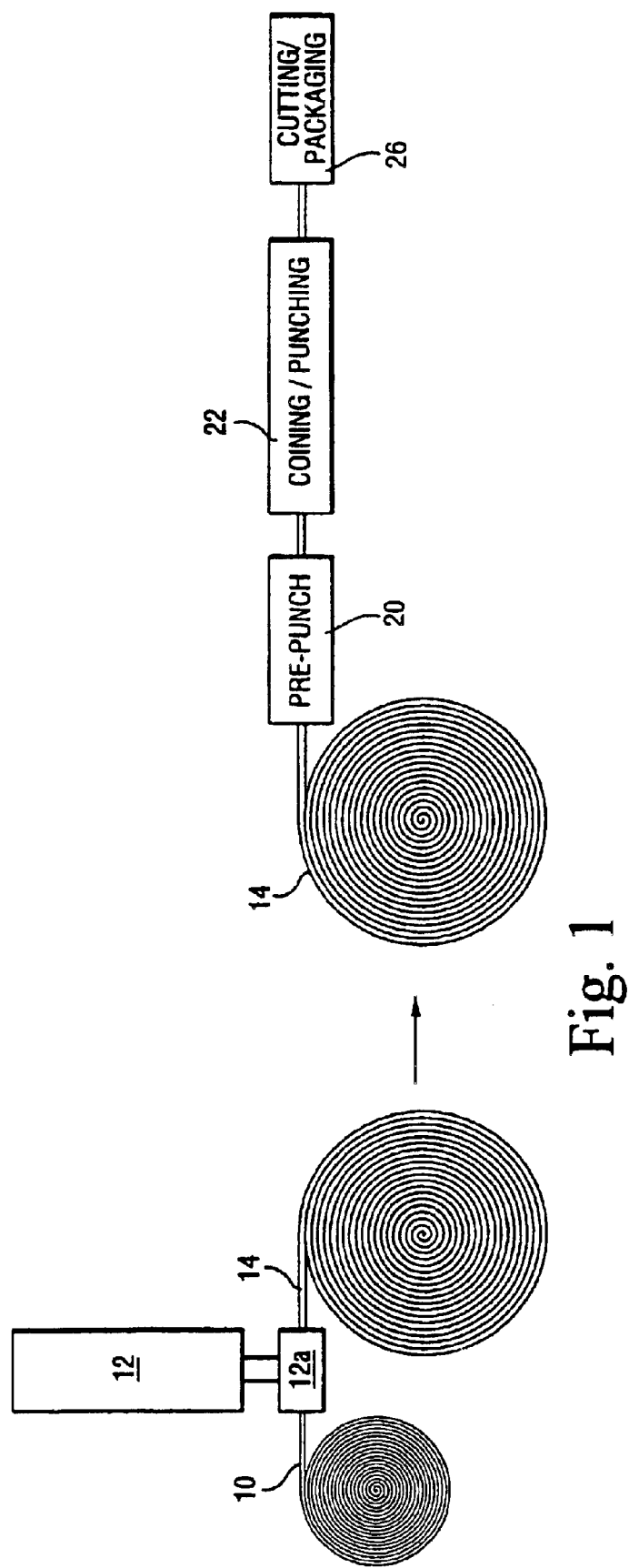
FIG. 1 is a schematic view showing a possible manufacturing sequence in accordance with the present invention.
Figure 2:
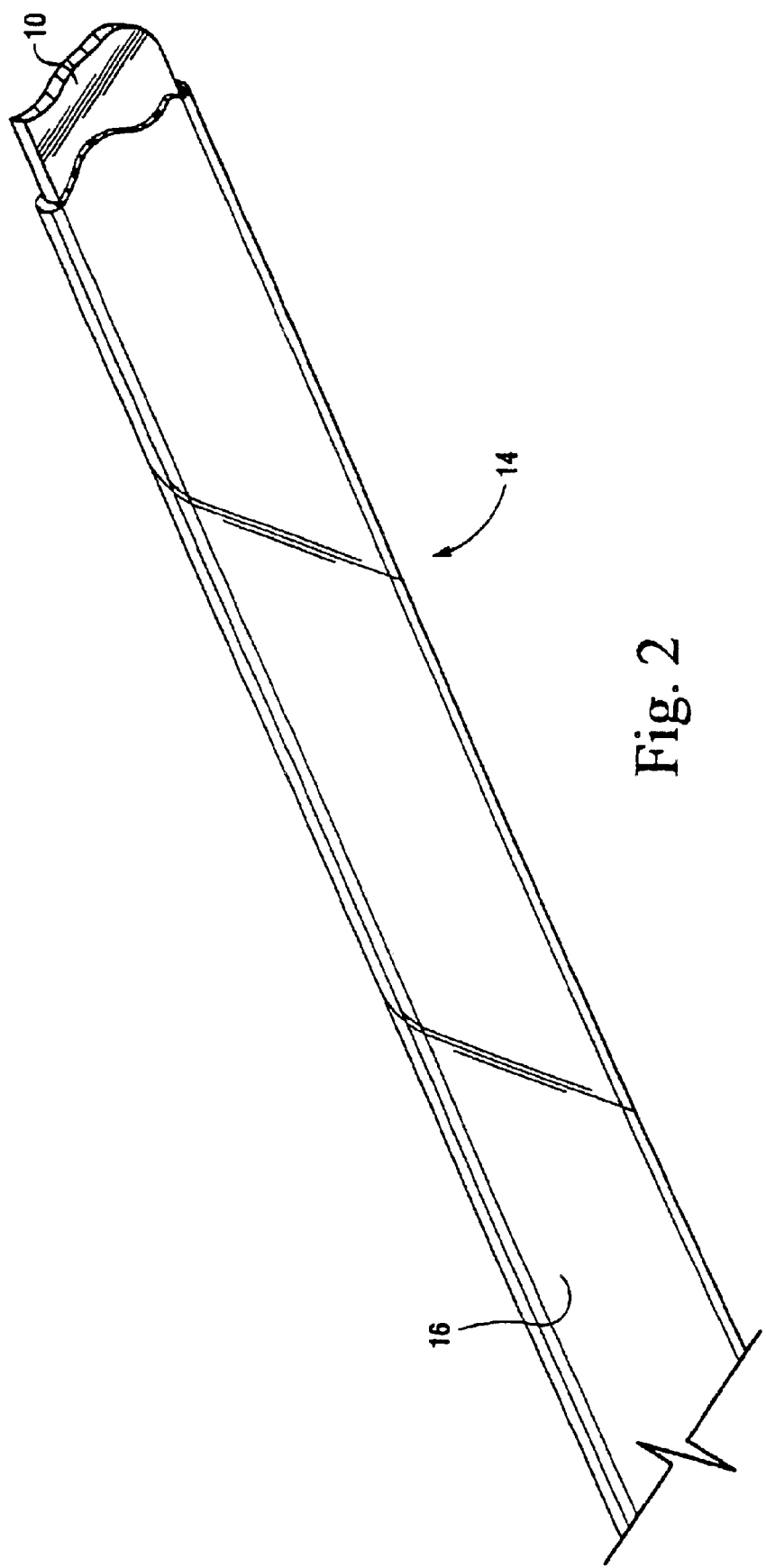
FIG. 2 is a perspective view showing a coated strip preform that is made in accordance with the present invention.

Accompanying FIG. 1 depicts one possible manufacturing sequence for making the upholstery tack strip of the present invention. In this regard, a roll of metal strip or ribbon stock 10 may be fed to and through the cross-head die 12a associated with screw extruder 12. As is well known, thermoplastic pellets may be fed into the hopper (not shown) of the screw extruder 12. The extruder 12 thus forms a molten stream of the thermoplastic material which is fed into the cross-head die 12a. Upon cooling, therefore, the thermoplastic material is thereby coated onto the metal ribbon stock 12 so as to form a composite strip preform 14. Specifically, as shown in FIG. 2, the preform 14 includes a core of the metal ribbon stock 10 which is embedded with, and thus coated entirely by, a sleeve 16 formed of solidified thermoplastic material (i.e., the solidified residue of the thermoplastic material applied in its molten state by the cross-head die 12a). Virtually any thermoplastic material may be employed in accordance with the present invention. Preferred thermoplastic materials include polyolefins (e.g., polyethylene and polypropylene), nylons, polyesters, polyvinyl chlorides and the like.

Figure 3:
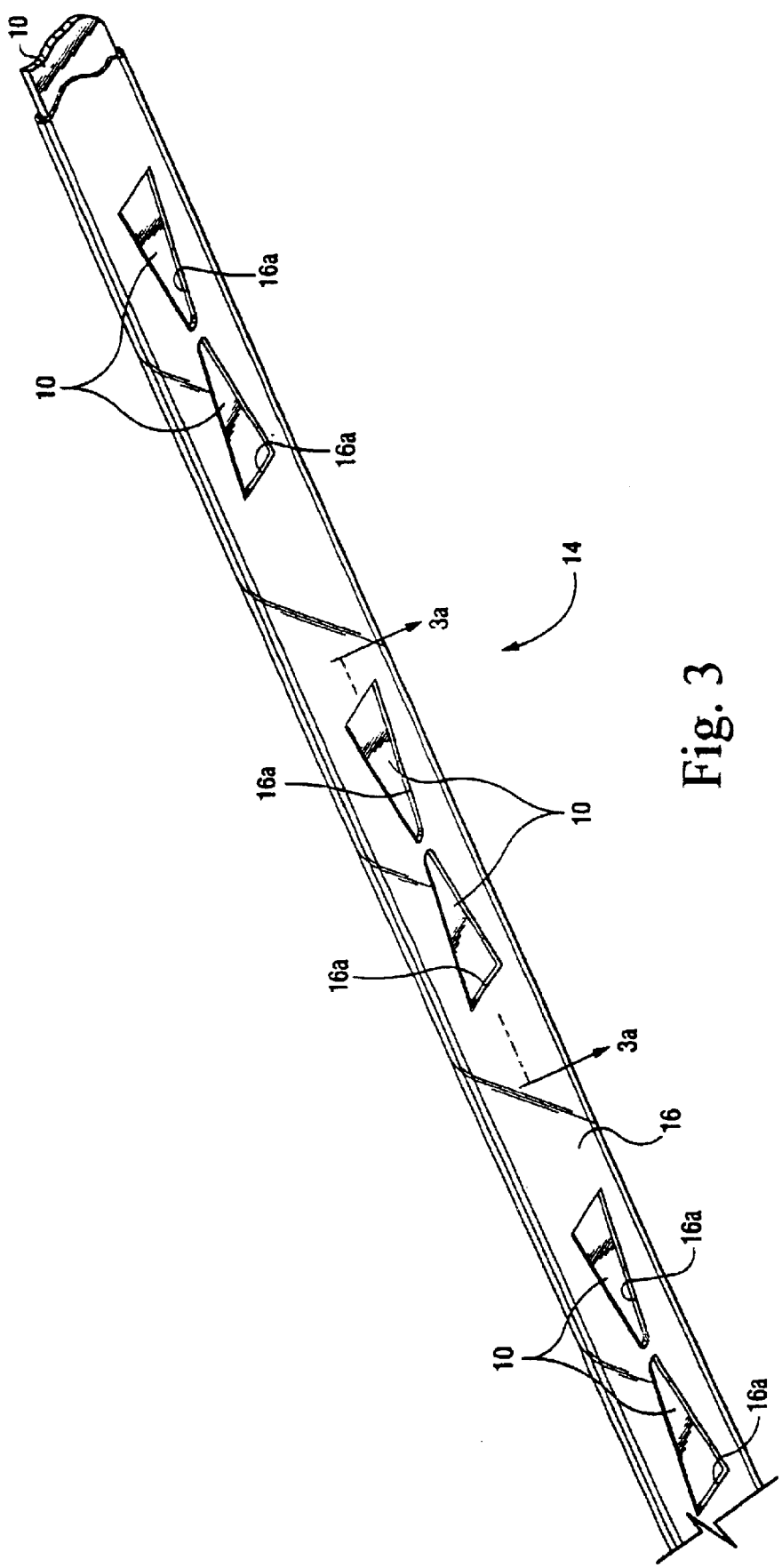
FIG. 3 is a perspective view similar to the preform of FIG. 2 but showing the windows which are subsequently formed in the plastic coating material of the integral sleeve thereof.
Figure 3A:
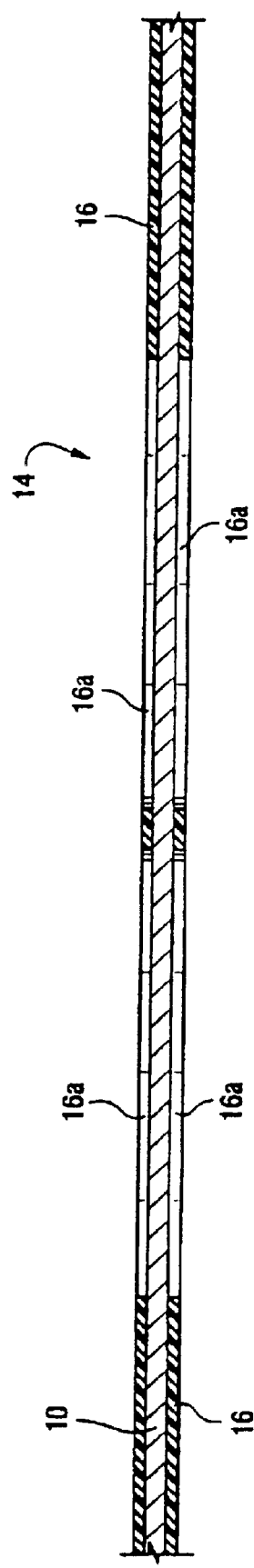
FIG. 3a is an enlarged cross-sectional view of the tack strip preform as taken along line 3a—3a in FIG. 3.

The composite strip preform 14 may be formed into a roll and then used as a feed for a pre-punch operation 20 as shown in FIG. 1. Alternatively, the composite strip preform 14 may be fed continuously from the cross-head die 12a to the pre-punch operation 20. During the pre-punch operation, as shown in accompanying FIGS. 3 and 3a, opposed sections of the sleeve 16 are removed at lengthwise separated locations along the preform 14 so as to form windows 16a through which corresponding opposed surface portions of the encased metal ribbon 10 are exposed. As is perhaps better shown in FIG. 3a, a registered pair of such windows 16a is formed on both the upper and lower surfaces of the sleeve 16.

Figure 4A:
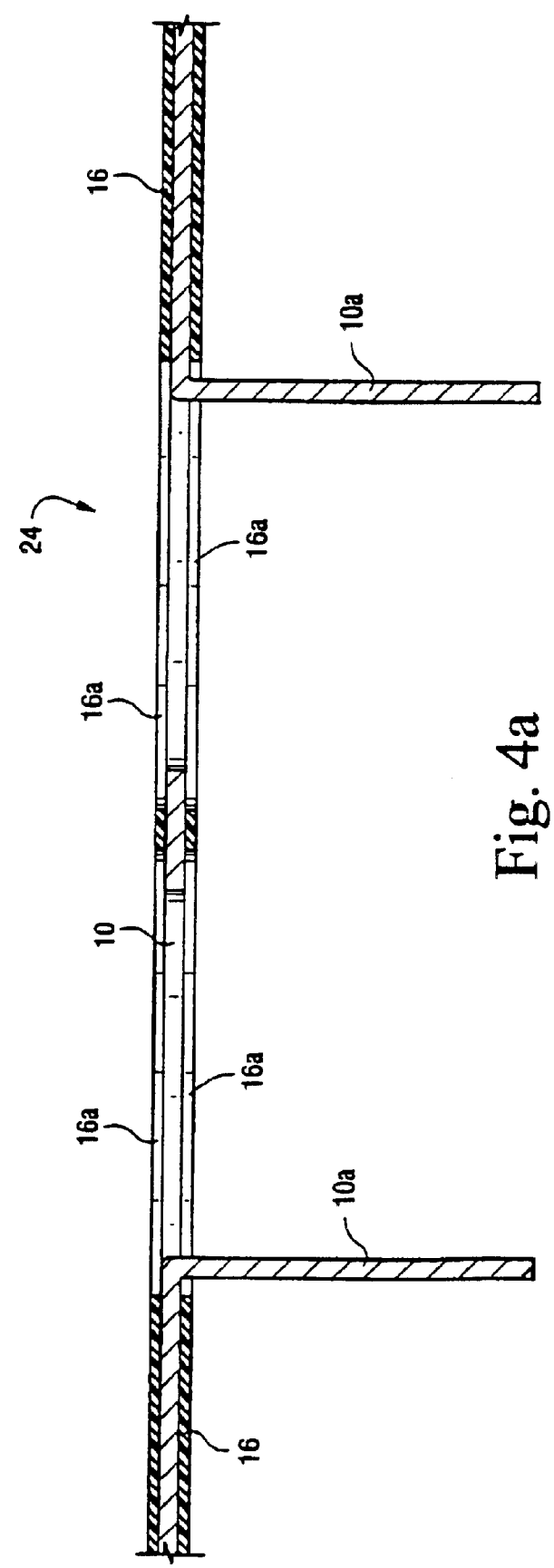
FIG. 4a is an enlarged cross-sectional view of the finished tack strip as taken along line 4a—4a in FIG. 4.
Figure 4:
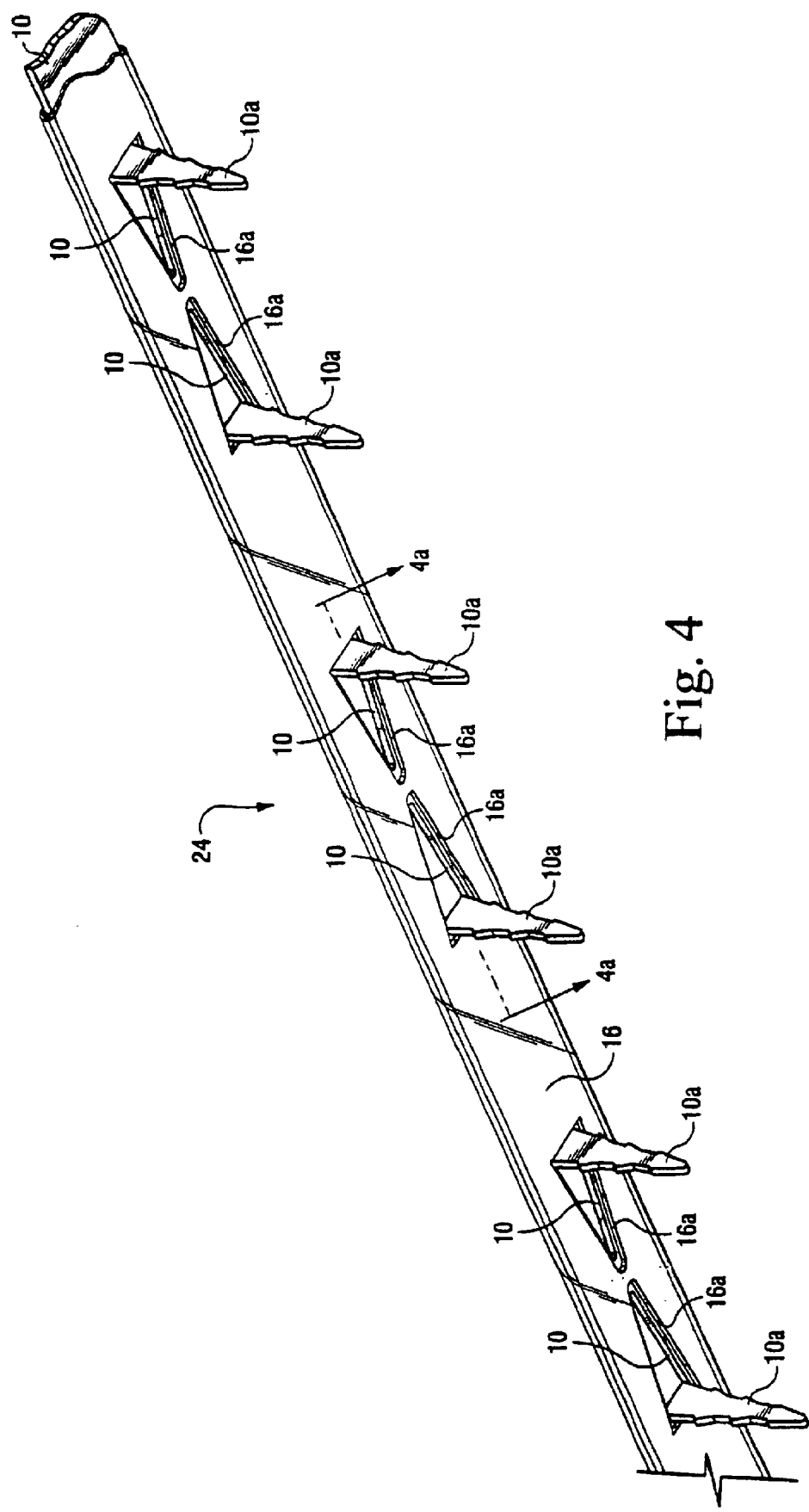
FIG. 4 is a perspective view similar to FIGS. 2 and 3 showing the finished tack strip in accordance with the present invention.

The purpose of the registered pairs of opposed windows 16a is to allow the nail-forming punch dies in the coining/punching operation 22 to bear directly against the upper and lower surfaces metal strip 10. Thus, the size of the windows 16a is larger than the foot print of the nail-forming dies in the coining/punching operation 22. As with conventional tack strips, therefore, the coining/punching operation 22 serves to punch out generally triangularly shaped nails 10a from the metal ribbon 10 and bend them at substantially right angles thereto as shown in accompanying FIGS. 4 and 4a. The finished tack strip 24 in accordance with the present invention may then be cut into desired lengths (e.g., from about 3 inches in length up to about 48 inches in length), packaged and shipped in operation 26 as shown in FIG. 1.

As can be appreciated, since the sleeve 16 is formed as an integral extruded member which embeds the metal ribbon stock 10, it does not need to be installed during a separate operation. Furthermore, the formation of the nails 10a will necessarily prevent any relative lengthwise movements from occurring between the metal ribbon stock 10 and the sleeve 16.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making an upholstery tack strip comprising the steps of:
   (i) extruding a thermoplastic sleeve over a length of metal ribbon stock;
   (ii) removing portions of the thermoplastic sleeve at lengthwise locations to form opposed registered sleeve windows so as to expose corresponding opposed surface regions of the metal ribbon stock; and
   (iii) forming nail sections from said exposed corresponding surface regions of the metal ribbon which protrude outwardly from respective ones of the sleeve windows.

2. The method of claim 1, wherein step (ii) is practiced so as to form generally triangularly shaped sleeve windows.

3. The method of claim 2, wherein step (iii) is practiced so as to form generally triangularly shaped nail sections, and wherein step (ii) is practiced so that the generally triangularly shaped sleeve windows are larger than the generally triangularly shaped nail sections.

4. The method of claim 1, wherein said sleeve is formed of a thermoplastic material selected from the group consisting of polyolefins, nylons, polyesters, and polyvinyl chlorides.

5. The method of claim 1, wherein step (i) is practiced by passing the metal ribbon stock through a cross-head die, and coating molten thermoplastic material onto the metal ribbon stock in the die.

6. A method of making an upholstery tack strip comprising the steps of:
   (i) forming a tack strip perform comprised of a metal ribbon stock which is embedded within and coated entirely by a sleeve formed of a solidified thermoplastic material by extruding a molten thermoplastic coating over a length of the metal ribbon stock and allowing the thermoplastic sleeve coating to solidify;
   (ii) removing a portion of the thermoplastic sleeve; and thereafter
   (iii) punching nail sections outwardly from the metal ribbon stock of the tack strip preform to thereby form the upholstery tack strip.

7. The method of claim 6, wherein step (ii) comprises removing a portion of the thermoplastic sleeve to form a window therein so as to expose a surface region of the metal ribbon stock.

8. The method of claim 7, wherein step (ii) is practiced so as to form generally triangularly shaped sleeve windows.

9. The method of claim 8, wherein step (iii) is practiced so as to form generally triangularly shaped nail sections, and wherein step (ii) is practiced so that the generally triangularly shaped sleeve windows are larger than the generally triangularly shaped nail sections.

10. The method of claim 6, wherein said sleeve is formed of a thermoplastic material selected from the group consisting of polyolefins, nylons, polyesters, and polyvinyl chlorides.

11. The method of claim 6, wherein step (i) is practiced by passing the metal ribbon stock through a cross-head die, and coating molten thermoplastic material onto the metal ribbon stock in the die.

* * * * *